(12) United States Patent
Cho

(10) Patent No.: US 6,550,865 B2
(45) Date of Patent: Apr. 22, 2003

(54) HEADREST ASSEMBLY FOR PROTECTING THE NECK OF A VEHICLE SEAT OCCUPANT

(75) Inventor: Young-Gun Cho, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/119,965

(22) Filed: Apr. 9, 2002

(65) Prior Publication Data

US 2003/0030316 A1 Feb. 13, 2003

(30) Foreign Application Priority Data

Aug. 9, 2001 (KR) .................................. 2001-0048017

(51) Int. Cl.[7] ................................................ A47C 1/10
(52) U.S. Cl. ............. 297/408; 297/216.12; 297/216.13; 297/216.14
(58) Field of Search ................................ 297/408, 409, 297/391, 216.12, 216.13, 216.14

(56) References Cited

U.S. PATENT DOCUMENTS 5,927,804 A * 7/1999 Cuevas
6,019,424 A * 2/2000 Ruckert et al.
6,179,379 B1 * 1/2001 Andersson
6,199,947 B1 * 3/2001 Wiklund

FOREIGN PATENT DOCUMENTS

KR   1996-033940   7/1998

* cited by examiner

*Primary Examiner*—Laurie K. Cranmer
(74) *Attorney, Agent, or Firm*—Pennie & Edmonds LLP

(57) ABSTRACT

The present device relates to a headrest assembly for protecting the neck of a vehicle seat occupant by preventing sudden movement of a head upon rear end collisions, and more particularly, to a headrest assembly for protecting the neck of a vehicle seat occupant, comprising the first actuating rod pivotally connected to the upper cross member of a seatback frame and rotatably installed inside the seatback, which moves the headrest forward upon rear end collisions in order to limit the backward movement of the head of a vehicle seat occupant, and the second actuating rod pivotally connected to the lower cross member of a seatback frame under the first actuating rod, wherein said actuating rods are linked by means of a sliding assembly.

8 Claims, 3 Drawing Sheets

HEADREST ASSEMBLY FOR PROTECTING THE NECK OF A VEHICLE SEAT OCCUPANT

FIELD OF THE INVENTION

The present invention relates to a headrest assembly for protecting the neck of a vehicle seat occupant by preventing a sudden movement of the head of the occupant upon rear end collisions

BACKGROUND OF THE INVENTION

Typically, a motor vehicle is provided with a headrest arranged on the upper part of a seatback in order to protect the neck of a vehicle seat occupant in case of rear end collisions and to be comfortable in normal driving by supporting the seat occupant's head.

The accompanying FIG. 1 is a side view depicting the state of a vehicle seat occupant in general when a rear end collision is occurred. As shown, a headrest 13 is mounted on the upper part of a seatback so as to support the head of an occupant. In this arrangement, because the rearward movement of a head is restricted while forward movement of the head is free, the vehicle seat occupant risks a serious neck injury by a rear impact such as rear end collisions. Namely, on rear end collision, the head and the body of the occupant are backwardly moved in a different acceleration by an inertial force, whereby a neck injury can occur due to the sudden movement of the head with respect to the body.

In consideration of said drawback, the Korean Utility Model Application No. 1996-033940 discloses a headrest assembly for protecting the neck, which is designed to rapidly move the headrest toward the head of a vehicle seat occupant upon a rear end collision in order to restrict the rearward movement of the head of the occupant. As described in this Utility Model application, an actuating rod is positioned in a seatback for moving the headrest forward in order to support the rearward movement of the head of an occupant. A post-insert hole formed on the upper end of said actuating rod secures a post extending from the headrest, wherein said actuating rod is downwardly extended to the part where the load of the occupant is applied. The actuating rod is also pivotally mounted to the cross member of a seatback frame by means of a pivotal ring, whereby on rear end collisions, the upper part of said actuating rod is rotated forward at a certain angle and the lower part of said actuating rod is rotated backward at a certain angle.

However, such headrest assemblies have disadvantages. As shown in FIG. 5, a rear impact such as rear end collisions causes the back of the occupant to push the seatback 11 in backward direction, which accordingly causes the lower end of the actuating rod 15 (hereinafter, which is referred as to press part M to be pushed backward. In FIG. 5, a letter 'K' refers to the distance from the pivotal ring 19 to the center of the headrest 13, and the letter 'a' refers to the distance from said pivotal ring 19 to the center of the press part M.

In the above headrest assembly, the movement of the press part M is very slight because the seatback 11 has characteristic shock absorption in itself, moreover the actual rotating angle of the actuating rod 15 is not sufficient. Accordingly, the headrest 13 cannot be sufficiently moved toward the head of the occupant. Furthermore, the headrest is unnecessarily moved forward in response to the ordinary movement of the occupant.

SUMMARY OF THE INVENTION

The present invention provides a headrest assembly for protecting the neck of a vehicle seat occupant that enables the headrest to sufficiently move forward to support the head of the occupant. The movement of the headrest is initiated by a inertial force occurred through rear end collisions.

According to a preferred embodiment, the present invention includes a guide body, a first actuating rod, a second actuating rod and a press part disposed within a vehicle seat including a headrest. The guide body has a guide groove formed in a vertical direction.

Upon a rear end collision, the lower end of the second actuating rod is moved backward and the upper end of said second actuating rod is moved forward. Subsequently, the first actuating rod linked to the second actuating rod is moved forward while the sliding end of the second actuating rod is sliding through the guide groove of the guide body.

The first actuating rod is integrally formed with the guide body, which is pivotally connected to the upper cross member of the seatback frame and rotatably installed inside the seatback. The headrest is mounted on the upper end of the first actuating rod, and is moved forward upon rear end collisions in order to support the head of a vehicle seat occupant. The second actuating rod is pivotally connected to the lower cross member of the seatback frame under the first actuating rod 21. The second actuating rod is linked to the first actuating rod by means of a sliding end engaged with the guide groove. The press part is formed at the lower end of the second actuating rod such that a rearward load from the back of the seat occupant may be applied thereto.

In a further preferred embodiment, a resilient means is installed in front of the press part which is deformed to change the thickness thereof under the pressure and restored to an original thickness thereof when the pressured is released. Furthermore, the resilient means is preferably an airbag filled with a predetermined amount of air, and made of an elastic material.

In a further preferred embodiment of the invention, the headrest assembly includes at least one headrest support member pivotably mounted on a first horizontal axis with respect to the seat back and extending above the seat back. The headrest is mounted on the at least one headrest support member opposite the pivotable mount. An actuating member is pivotably mounted on a second horizontal axis disposed below the first horizontal axis. The actuating member includes an actuating arm extending below the second horizontal axis to receive forces applied by a seat occupant as a result of a rear end collision, and a linkage arm extending above the second horizontal axis. The linkage arm is slidably linked to the at least one headrest support member and cooperates with the support member to force the headrest forward in response to rearward force applied to the actuating arm by the vehicle seat occupant.

DETAILED DESCRIPTION OF THE INVENTION

Figure 1:
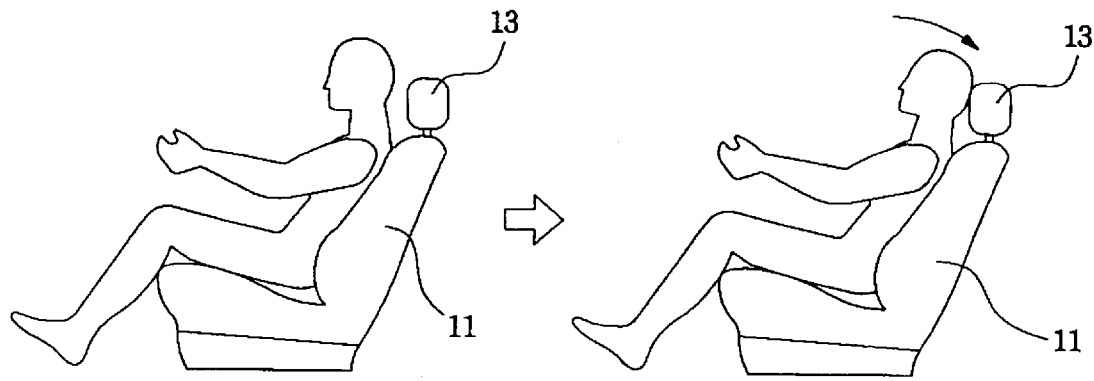
FIG. 1 is a side view depicting the state of a vehicle seat occupant when a rear end collision occurs.
Figure 2:
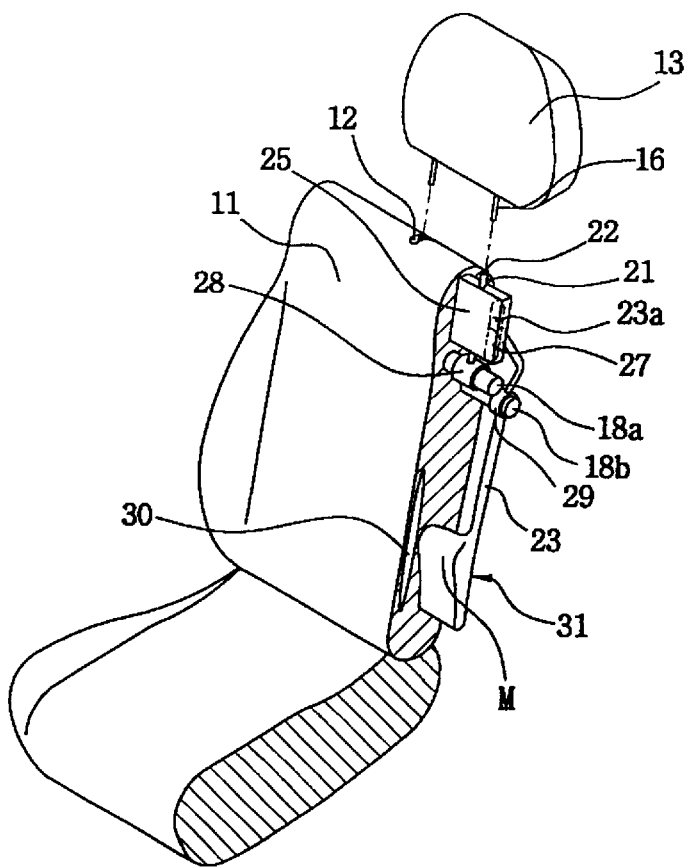
FIG. 2 is a partially cut away perspective view of a vehicle seat comprising a headrest assembly for protecting the neck of a vehicle seat occupant according to the present invention.
Figure 3:
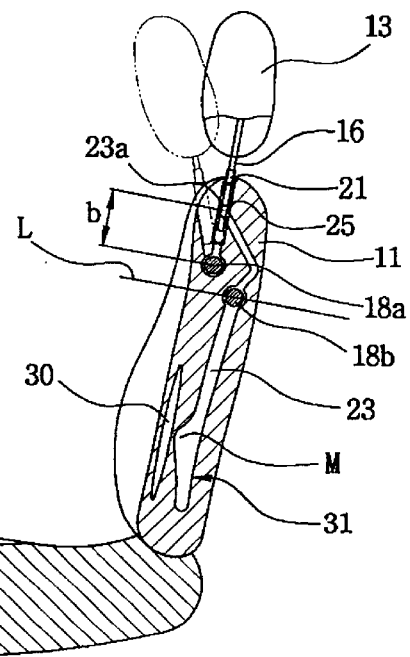
FIG. 3 is a sectional view illustrating operation of a headrest assembly for protecting the neck of a vehicle seat occupant according to the present invention.
Figure 4:
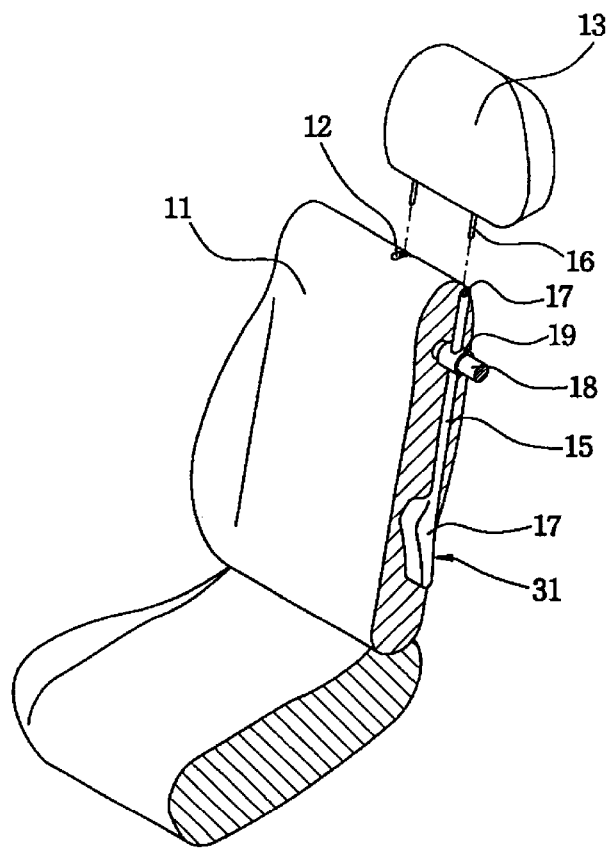
FIG. 4 is a partially cut away perspective view of a vehicle seat comprising a headrest assembly for protecting the neck of a vehicle seat occupant according to the prior art.
Figure 5:
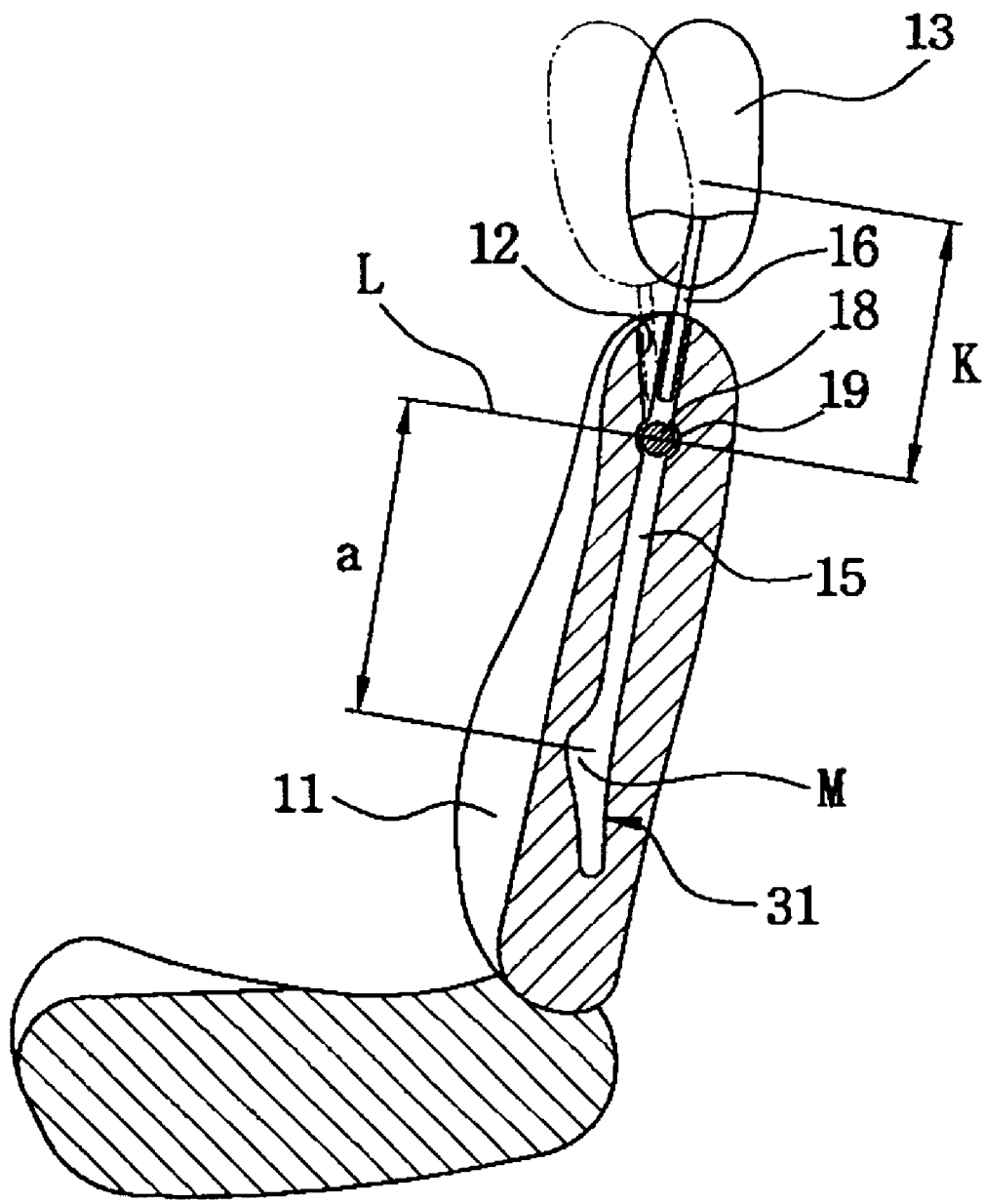
FIG. 5 is a sectional view illustrating the operation of a headrest assembly for protecting the neck of a vehicle seat occupant according to the prior art.

As shown in FIG. 2 and FIG. 3, the present invention is provided with two actuating rods mutually connected by sliding means, and pivotally connected to the cross members of seatback frames, respectively, in order to enlarge the movement of headrest 31. More specifically, the first actuating rod 21 is pivotally connected to the upper cross member 18a of a seatback frame and rotatably installed inside the seatback 11 for moving the headrest forward upon rear end collisions in order to limit the movement of the head of a vehicle seat occupant. The second actuating rod 23 is pivotally connected to the lower cross member 18b of a seatback frame under the first actuating rod 21.

Referring to the second actuating rod 23, the upper end thereof is a sliding end 23a which engages with a guide groove 27 of a guide body 25 integrally formed with the first actuating rod 21. In addition, a press part M is formed at the lower end of the second actuating rod 23. As rearward load is applied to the press part M upon a rear end collision, the upper part of the second actuating rod is rotated forward around the lower cross member 18b of seatback frame as a pivotal axis. In same manner, the lower part of the second actuating rod is rotated backward around the lower cross member 18b of seatback frame.

As shown in FIG. 2 and FIG. 3, the upper part of the second actuating rod is bent forward at a predetermined angle in order to be connected to the first actuating rod 21, whereby the movement of the second actuating rod is transferred to the first actuating rod also pivotally movable.

In the above arrangement, the pivotal ring 29 of the second actuating rod 23 is preferably located below the line 'L' where an inertial force is applied so as to be capable of rotating the second actuating rod in response to the movement of the press part M.

Referring to the first actuating rod, the post-insert hole 22 is formed at the upper end of thereof for inserting the post extending from the headrest 13, and the lower end of the first actuating rod is pivotally connected to the upper cross member 18a of the seatback frame as described above. Opening 12 is preferably formed to have enough length on the top of a seatback 11 so as not to interfere with the movement of the first actuating rod 21. Referring to the guide groove 27 formed on the guide body 25 for engaging with the sliding end 23a of the second actuating rod, it is preferable to form said guide groove 27 in parallel with longitudinal direction of the first actuating rod 21.

In another embodiment of the present invention, two assemblies comprising the first actuating rod 21 and the second actuating rod 23 are installed to the right and left side of the seatback, respectively, wherein said assemblies are integrated at the press part M of each second actuating rod 23. Because the actuating rods of the assemblies share the same cross members of seatback frame as pivotal axes, the operation of said assemblies is identical with each other.

In another embodiment of the present invention, a resilient means 30 is installed in front of the press part M in seatback 11. Resilient means 30 is deformed to change the thickness thereof under the pressure and is restored to an original thickness thereof when the pressured is released. In a preferred embodiment, the resilient means 30 is realized by employing an airbag filled with a predetermined amount of air, and made of an elastic material.

With the resilient means 30 installed in front of the press part M, the ordinary load caused by weight of an occupant in normal state does not actuate said press part M. Accordingly, the headrest is only moved forward when a rear end collision is occurred. Because the load caused by weight of an occupant in normal driving state does not actuate said press part M, the headrest remains in normal location. Due to the resilient means 30 the headrest 13 does not move except at a threshold amount of a rear impact such as rear end collisions.

If a load in excess of the threshold amount is applied to the seatback 11 by a rear end collision, the second actuating rod 23 installed inside the seatback 11 is rotated around the second pivotal ring 29, thereby the upper part of the second actuating rod 23 is moved forward. Subsequently, while the sliding end 23a, formed at the end of the second actuating rod 23, slides through the guide groove of the guide body 25, the first actuating rod is rotated around the first pivotal ring 28. Accordingly, the headrest 13 secured to the upper end of the first actuating rod 21 by means of posts inserted in post-insert hole 22 is moved forward. As a result, the head of an occupant is safely supported by the headrest 13 preventing the head from suddenly being moved backward by rear impact, and a neck injury is efficiently prevented.

The present invention is additionally advantageous in that it is easily adjustable to change the rotation angle of the headrest without any limitation raised by room of a vehicle and the body size of the occupant 13 by changing the distance 'b' from the first pivotal ring 28 to the slide end 23a engaged with the guide groove 27.

As described above, the present invention provides a headrest assembly for protecting the neck of a vehicle seat occupant, which enables a headrest to sufficiently rotate forward to support the head of the occupant.

Furthermore, the present invention provides a headrest assembly for protecting the neck of a vehicle seat occupant, wherein the movement of the headrest is only initiated by an inertial force occurred by rear end collisions.

With the headrest assembly according to the present invention, it is advantageous in that not only a neck injury is efficiently prevented, but also the inconvenience of an occupant raised by unnecessary movement of a headrest is removed by a resilient means.

What is claimed is:

1. A headrest assembly for protecting the neck of a vehicle seat occupant comprising:

a guide body having a guide groove thereon;

a first actuating rod integrally formed with said guide body, which is pivotally connected to an upper cross member of a seatback frame of a seatback and rotatably installed inside the seatback, wherein a headrest is mounted on an upper end of said first actuating rod, and said headrest is forwardly moved upon rear end collisions in order to support the head of a vehicle seat occupant;

a second actuating rod having an upper end and a lower end pivotally connected to a lower cross member of the seatback frame under said first actuating rod, wherein said second actuating rod is connected to said first actuating rod by means of a sliding end engaged with said guide groove of said guide body; and a press part formed at the lower end of said second actuating rod, such that a rearward load from the back of the occupant may be applied thereto, wherein, upon a rear end collision, the lower end of said second actuating rod is moved backward and the upper end of said second actuating rod is moved forward, whereby the first actuating rod coupled to the second actuating rod is moved forward while the sliding end of the second actuating rod is sliding through the guide groove of the guide body.

2. The headrest assembly according to claim 1, further comprising a resilient means installed in front of the press part in seatback, wherein said resilient means is deformed to change the thickness thereof under the pressure and is restored to an original thickness thereof when the pressured is released.

3. The headrest assembly according to claim 2, wherein the resilient means is an airbag filled with a predetermined amount of air, and made of an elastic material.

4. A headrest assembly for a vehicle seat back, comprising:

at least one headrest support member pivotably mounted on a first horizontal axis with respect to said seat back and extending above the seat back;

a headrest mounted on said at least one headrest support member opposite said pivotable mount; and an actuating member pivotably mounted on a second horizontal axis disposed below said first horizontal axis 18*a*, said actuating member including an actuating arm 23 extending below said second horizontal axis to receive forces applied by a seat occupant as a result of a read end collision and a linkage arm extending above said second horizontal axis, wherein the linkage arm is slidably linked to said at least one headrest support member and cooperates with said support member to force the headrest forward in response to rearward force applied to the actuating arm by the vehicle seat occupant.

5. The headrest assembly of claim 4, wherein said at least one headrest support member is pivotably mounted on a first seat back cross member and said actuating member is pivotably mounted on a second seat back cross member.

6. The headrest assembly of claim 4, wherein the second horizontal axis is disposed below the first horizontal axis.

7. The headrest assembly of claim 4, further comprising a resilient means disposed within the seat back in front of the actuating member actuating arm.

8. The headrest assembly of claim 4, wherein said resilient means comprises an airbag configured and dimensioned to absorb ordinary loads exerted by a seat occupant on the seat back and actuating arm such that only excessive loads cause the head rest to move forward.

* * * * *